United States Patent [19]

Dreschmann et al.

[11] Patent Number: 4,580,913
[45] Date of Patent: Apr. 8, 1986

[54] ANTI-FRICTION BEARING PROTECTIVE CAP

[75] Inventors: Peter Dreschmann, Dittelbrunn; Anton Schmidt, Hassfurt, both of Fed. Rep. of Germany

[73] Assignee: FAG Kugelfisher Georg Schäfer KGaA, Fed. Rep. of Germany

[21] Appl. No.: 729,672

[22] Filed: May 2, 1985

[30] Foreign Application Priority Data

May 9, 1984 [DE] Fed. Rep. of Germany ....... 3417069

[51] Int. Cl.$^4$ ............................................. F16C 41/04
[52] U.S. Cl. .................................. 384/448; 308/1 A; 384/536
[58] Field of Search ............... 384/448, 480, 489, 536; 308/1 A, 1 R

[56] References Cited

U.S. PATENT DOCUMENTS

| | | | |
|---|---|---|---|
| 3,501,207 | 3/1970 | Pritchard | 384/448 |
| 3,899,226 | 8/1975 | Frost et al. | 384/480 |
| 4,277,114 | 7/1981 | Lindegger | 384/480 |
| 4,398,777 | 8/1983 | Murphy | 308/1 A |

*Primary Examiner*—Lenard A. Footland
*Attorney, Agent, or Firm*—Ostrolenk, Faber, Gerb & Soffen

[57] ABSTRACT

An anti-friction bearing has a covering comprising first and second caps respectively over each of its races, and the caps are snap-locked to the bearing so as to enclose the bearing within it and to protect the same. An elastic material ring surrounds the peripheries of the two caps and protrudes outwardly protecting the bearing against impact damage. The periphery of the wall of one of the caps is conically tapered and the other of the caps pushes the elastic ring toward the wider end of the tapered wall for tensioning the ring.

10 Claims, 2 Drawing Figures

ANTI-FRICTION BEARING PROTECTIVE CAP

BACKGROUND OF THE INVENTION

The present invention relates to an anti-friction bearing, and more particularly to a protective cap arrangement for placement over the bearing during storage and shipment.

One such bearing is known from Federal Republic of Germany Application DE-OS No. 26 58 748. In that bearing, a cap of elastic material having an L-shaped cross-section is arranged around each race of the bearing. The legs of each cap face each other, form a seal and snap into each other as a result of the presence of holding projections. This produces a single structural unit.

It has been found that upon transportation of such bearings, breakage of the caps often occur. Ordinarily, these bearings are arranged and shipped alongside of and above one another in a box. During shipment, one bearing strikes against the bearing alongside it. The legs of the cap, which have thin walls in this region, can then break off.

The caps are shaped to define labyrinth seals and can be economically manufactured only with relatively large tolerances. Thus, the sealing effect also varies greatly depending upon the pair of caps used. A contacting or sliding seal cannot be produced due to the high rigidity of the ring flanges. The result would be impermissibly high friction, squeaking noises and high wear of the bearings.

SUMMARY OF THE INVENTION

The object of the invention therefore is to develop such a bearing so that the transportation damage described above is avoided.

A further object is to define a contacting seal of the enclosed covering over the bearing with constant low friction.

The present invention generally relates to an anti-friction bearing and more particularly to an improvement in the cap means disposed over the bearing for storage and shipment. The particular bearing with which the present cap means is intended for use is an annular bearing having two parallel raceways, each of which is in a respective plane and the planes are parallel, and the rolling elements between the two raceways also move through a plane that is parallel to the planes of the raceways.

The cap means over this roller bearing comprises a first cap over one of the races and a second cap generally over the other race, and the caps open toward and face toward each other. The caps each have an annular exterior periphery. An elastic material ring is supported on the peripheries of the caps and is of a size to project out of the peripheries of the caps, so that adjacent capped bearings will contact each other laterally through engagement between their elastic rings, instead of the cap means themselves contacting and damaging one another. Each cap of the cap means is held to the bearing inside. In the preferred form, each cap includes a projection or projecting wall which snaps on one of the races, and in the embodiment particularly shown, the projections of both of the caps engage the same one of the two raceways.

Each of the caps has a respective peripheral wall which extends around the outside of the bearing. The peripheral wall of one of the caps has a conically tapering periphery which tapers narrower toward the other cap. The other cap has a peripheral wall which extends past the outside of the wall of the first-mentioned cap. The elastic material ring is disposed around the tapered periphery of the wall of the one cap and the free edge of the other cap presses the elastic material ring up the widening periphery of the first cap, holding the ring under tension. In the preferred form, the ring is an O-ring.

The O-ring on the periphery of the cap avoids damage to the caps during transportation by simple means. Should neighboring bearings now strike against each other, as the result of blows to their shipping container, for example, the adjacent resilient O-rings contact each other and dampen the blow as a result of their elasticity. At the same time, a contacting seal of the enclosed covering over the bearing is obtained due to the conically developed seat of the O-ring and its initial tension, which causes the O-ring to rest with a definite force against both enclosing caps. In this way, it is possible, with an ordinary commercial part such as an O-ring, to solve two problems, namely protection upon transportation and enclosure sealing.

Other objects and features of the invention will be described with reference to the embodiment shown in the accompanying drawings.

DESCRIPTION OF A PREFERRED EMBODIMENT

Figure 1:
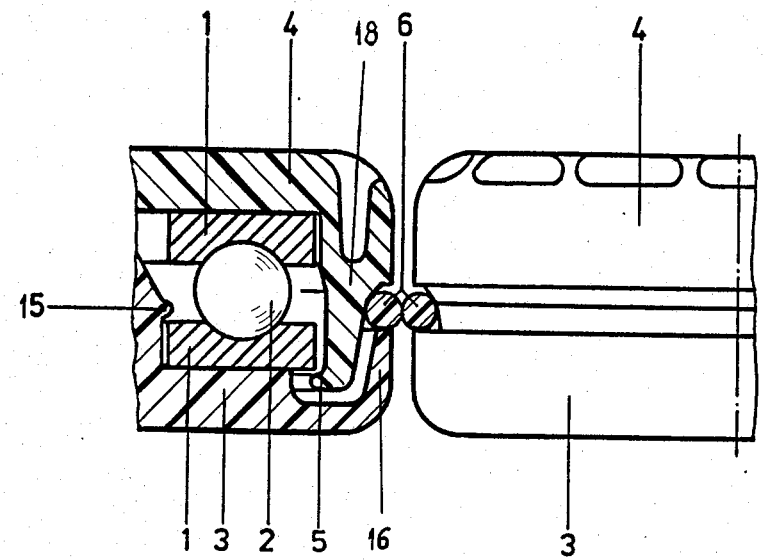
FIG. 1 shows a bearing according to the invention in a partial cross-sectional view, together with an adjacent bearing within the caps of the invention.

A telescopic-leg bearing according to FIG. 1 comprises two races 1 between which the rolling bodies 2 roll. In the illustrated bearing, the rolling bodies roll through a plane that is perpendicular to and horizontal in the drawing sheet. The races are in respective parallel planes above and below the rolling elements. The lower and upper races 1 are surrounded by caps 3 and 4, respectively, of generally L shape, as seen in partial cross-section. The caps are made of plastic. The caps have projections which hold the bearing together by snapping into place.

The cap 3 has a radially inwardly disposed, upwardly projecting inner wall which wraps around the radial interior of the lower race 1 and snaps onto it, thereby removably holding the cap 3 to the lower race. The cap 3 has a radially outwardly disposed, upwardly projecting peripheral wall 16 which extends upwardly past the lower race, is spaced radially outwardly from that race and its radially inward side is conically curved generally to parallel the outside of the cooperating wall 18 on the cap 4, described below.

The cap 4 has a radially outwardly disposed, downwardly projecting, peripheral wall 18, which wraps around the upper race 1 and includes an elongate leg that also extends down past the lower race 1 and passes radially inwardly of the lower cap peripheral wall 16 and includes a tip that snaps beneath the lower race. The exterior of the wall 18 conically tapers inwardly downwardly, parallel to the interior of the wall 16 and slightly spaced from the wall 16. As a result, the caps nest together. At the same time, the cap peripheral walls define a labyrinth seal.

At the peripheries of both caps, in the region in which they face each other, there is an O-ring 6 of a size to protrude beyond the diameter of the outer walls of the caps 3 and 4. The wall 18 of the cap 4 is developed conically tapered in the region of the seat of the O-ring, and the point of the cone faces the other cap 3, whereby the wall of the cap 4 tapers toward the cap 3.

The O-ring 6 is seated with initial tension around the wall 18 of the cap 4 near its narrower free end. The O-ring rolls inward, i.e. upward, on the outer diameter of the cone and rests, with its well-defined force, against the free edge of the other cap 3, which defines its seat.

The largest diameter of the O-ring 6 protrudes beyond the diameter of the caps 3 and 4, respectively. This provides protection against impacts which could cause breakage of the bearings or of their caps during transportation, as when several bearings are arranged loosely alongside of each other in a package.

Figure 2:
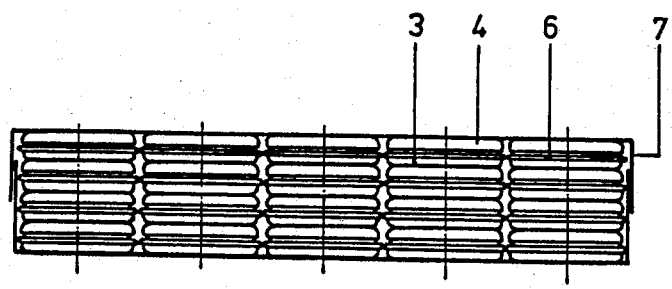
FIG. 2 shows the arrangement of a plurality of such bearings in an ordinary packing unit.

FIG. 2 shows a typical package in which the bearings of FIG. 1 are arranged above and alongside each other in a box 7. If the box 7, for instance, should tilt during transportation, then the bearings will slide and strike each other. The O-rings 6 dampen these blows and thus prevent breakage of the caps 3 and 4.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. Cap means for an anti-friction bearing, wherein the bearing comprises:
    a first and a second race and rolling elements between the races; the bearing being arranged so that the races are above one another and generally in respective parallel planes and the rolling elements between the races move through a plane parallel to the planes of the races;
    the cap means comprising:
    a first cap over the first race; a second cap over the second race; holding means on the caps for holding the caps together, thereby to enclose the bearing inside and between the caps;
    the caps both having an annular periphery; the caps having respective open sides that face toward each other; the caps generally meeting at their peripheries; and
    a ring of elastic material at the peripheries of the caps, the ring being generally in the vicinity of where the caps meet at their peripheries; the ring having an outer diameter great enough to protrude outside the peripheries of the caps.

2. The cap means of claim 1, wherein the holding means on each of the caps comprises a projecting element which projects toward the other cap, and the projecting element including snap-on means for snap-attachment of each of the caps to one of the races of the bearing.

3. The cap means of claim 2, wherein the snap-on means snap both of the first and second caps onto the same one of the races.

4. The cap means of claim 1, wherein the caps are shaped for interacting to define a seal around the peripheries of the caps.

5. The cap means of claim 1, wherein the ring is an O-ring.

6. The cap means of claim 5, wherein the second cap includes a second wall which projects toward the first cap, which extends around the second cap, and which defines the periphery of the second cap; the second wall including a free edge for engaging the ring around the first wall, for pushing the ring along the first wall as the first wall conically widens, thereby further tensioning the ring as the first and second caps are moved together until their holding means interengage.

7. The cap means of claim 6, wherein the holding means on the first cap comprises a third wall of the first cap which projects into the radial interior of the first race and holds to it, and the holding means of the second cap comprises the second wall which extends to and also holds to the first race.

8. The cap means of claim 7, wherein the holding means snap hold the second wall and the third wall to the first race.

9. The cap means of claim 1, wherein the first cap includes a first wall which projects toward the second cap, which extends around the first cap and which defines the periphery of the first cap; the first wall on the external periphery thereof tapering narrower in its outer diameter in the direction toward the second cap; the ring of elastic material being wrapped around the periphery of the first wall under initial tension and the ring projecting out of the first wall.

10. An anti-friction bearing with surrounding cap means, wherein the bearing comprises:
    a first and a second race and rolling elements between the races; the bearing being arranged so that the races are above one another and the races are generally in respective parallel planes and the rolling elements between the races move through a plane parallel to the planes of the races;
    the cap means comprising:
    a first cap over the first race; a second cap over the second race; holding means on the caps for holding the caps together, thereby to enclose the bearing inside and between the caps;
    the caps both having an annular periphery; the caps having respective open sides that face toward each other and the caps generally meet at their peripheries; and
    a ring of elastic material at the peripheries of the caps, the ring being generally in the vicinity of where the caps meet at their peripheries; the ring having an outer diameter great enough to protrude outside the peripheries of the caps.

* * * * *